United States Patent Office 3,277,238
Patented Oct. 4, 1966

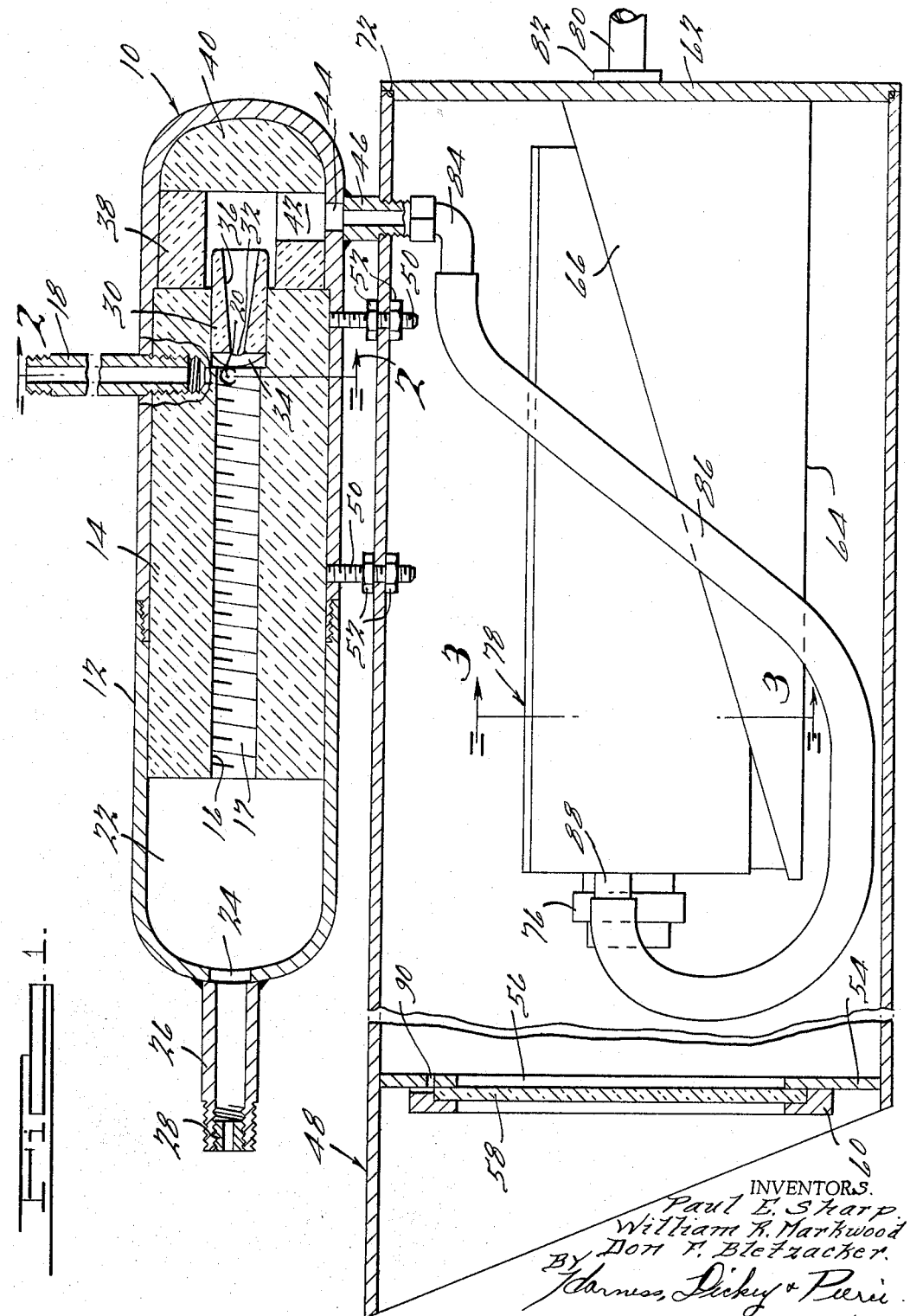

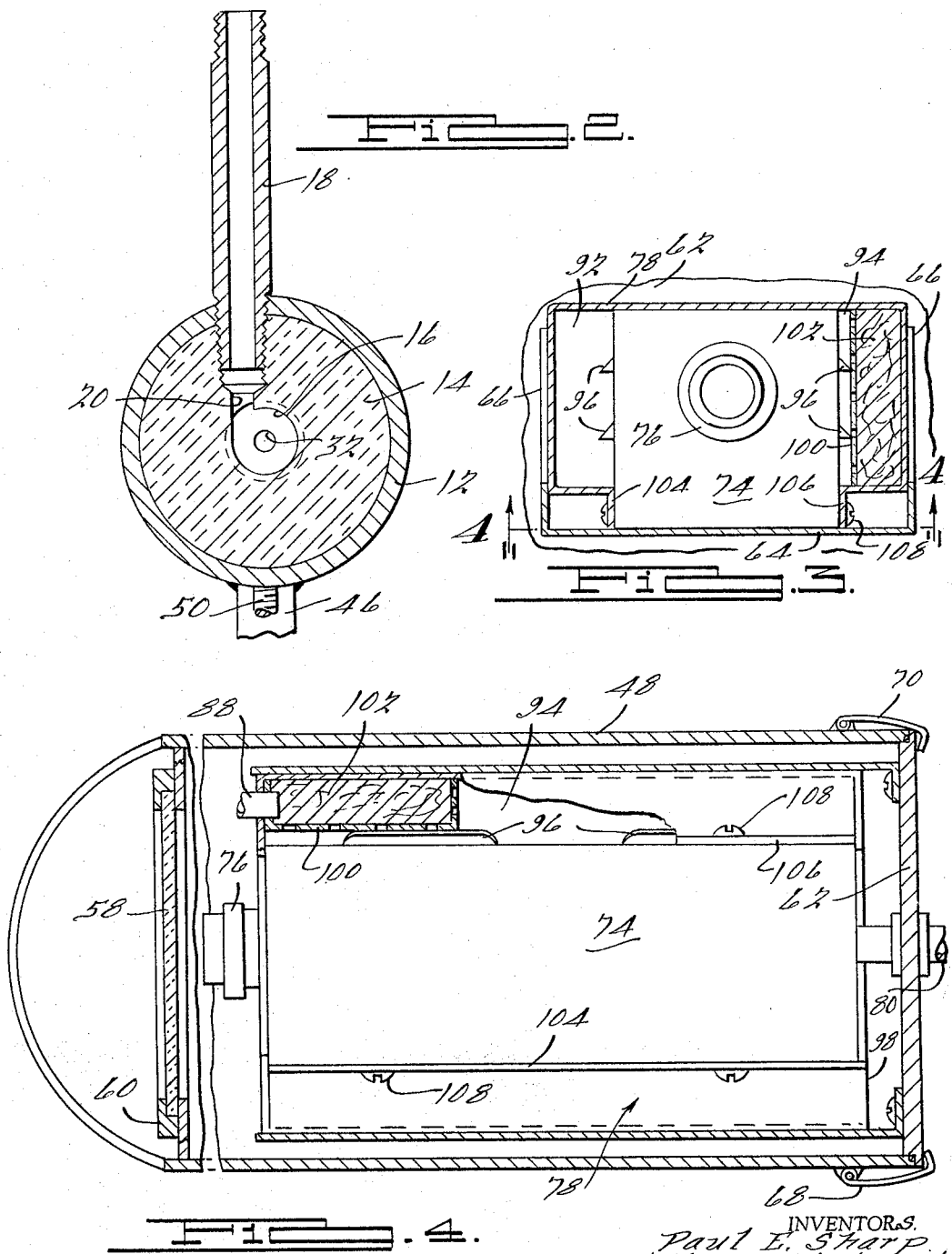

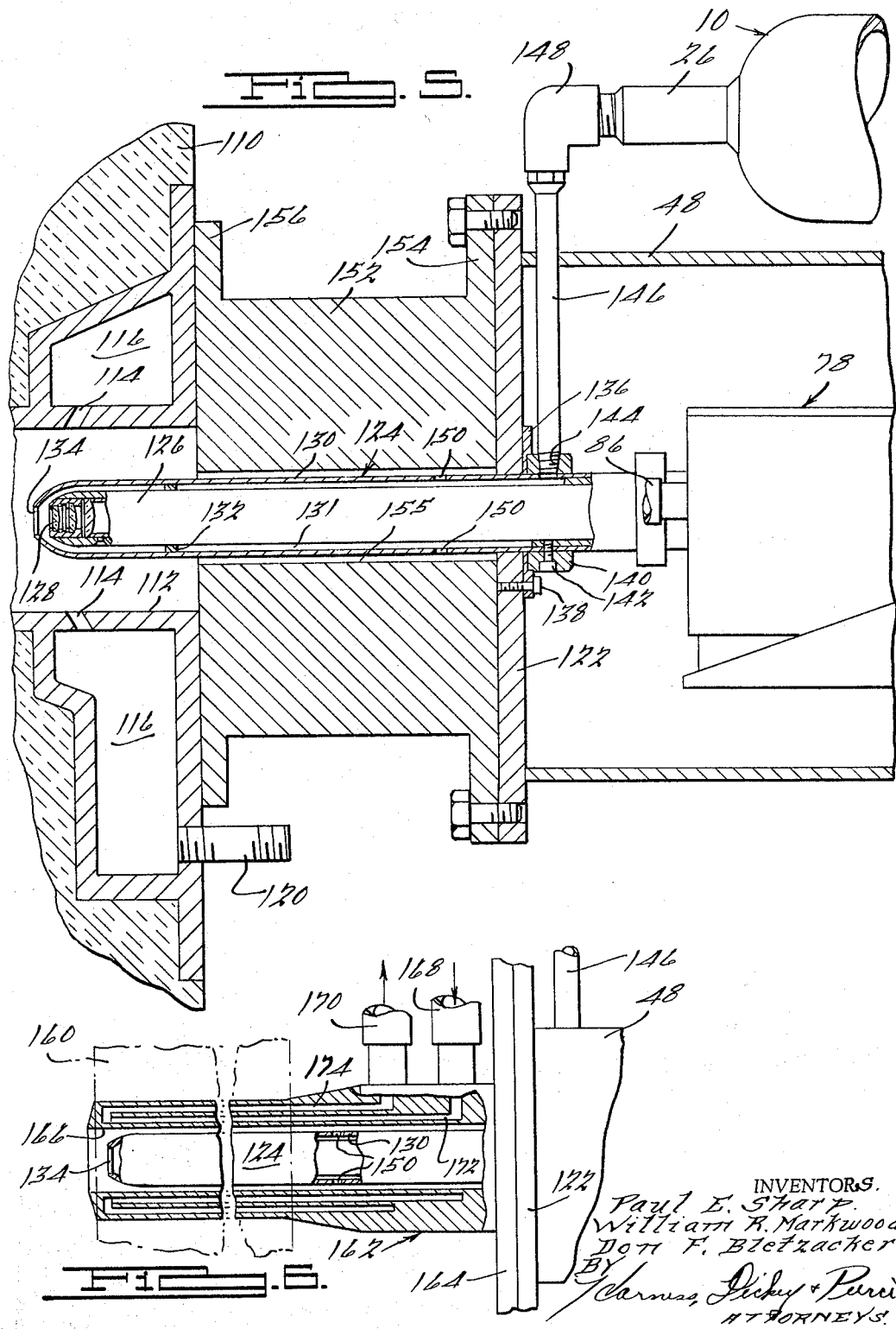

3,277,238
COOLING SYSTEM UTILIZING A RANQUE TUBE
Paul E. Sharp, William R. Markwood, and Don F. Bletzacker, Lancaster, Ohio, assignors to Diamond Power Specialty Corporation, Lancaster, Ohio, a corporation of Ohio
Filed Jan. 24, 1964, Ser. No. 340,057
24 Claims. (Cl. 178—7.2)

The present invention relates to cooling systems and particularly to a system for cooling, and in some cases also purging, solely through the use of air under pressure, remotely located temperature sensitive devices, such as industrial television cameras and the like, when they are placed in high temperature environments. The invention may be embodied in many different forms for cooling, and if desired purging, many different types of devices in all kinds of excessive temperature environments; however, for purposes of present illustration it will be described embodied in systems for cooling industrial television cameras and in certain cases also purging the lens assemblies thereof.

As is well known, closed circuit industrial television systems are becoming increasingly popular for hot viewing applications in the steel, cement, power and other heavy industries, such as for observing rolling ingots in a steel mill, viewing by means of a lens extension the interior of boilers or in the same manner the interior of a furnace, and so on. In such applications it is essential that means be provided for cooling the camera since in such applications the ambient temperature usually grossly exceeds the electronic and mechanical temperature ratings of the camera. Conventional air conditioning devices have been found to be highly unsatisfactory for such cooling applications in view of their size, complexity, high cost of manufacture, maintenance and operation, and so on. Water cooling alone is not suitable because of the amount of plumbing required, i.e. both supply and return lines, because of the expense of cold water in many places, and because of the substantial problem of built up deposits which usually occur. Air cooling is not satisfactory because of the extremely high temperatures encountered and because the air volume and velocities which would be necessary would be both expensive and would cause vibration which would result in picture distortion. Furthermore, in many such high temperature environments means must also be provided for purging the camera lens system from dust, flyash and the like in order to maintain clear viewing, and conventional cooling equipment does not provide ready means for accomplishing this function.

It is therefore a primary object of the present invention to provide a cooling system of the aforesaid type which is efficient in operation, simple and compact in construction, inexpensive to fabricate, install, maintain and operate, reliable in operation, and which provides continuous rather than cyclic cooling action.

Another object resides in the provision of a cooling system of the above type which contains neither electrical nor moving mechanical parts, and which requires for operation only compressed air, which may be supplied through a single conduit and is readily available throughout most plants in the heavy industries in which the system is particularly suited for use.

A further object concerns the provision of a cooling system of the aforesaid type in which actual cooling is obtained from compressed air by means of a vortex tube unit. A related object resides in the provision of an improved vortex tube construction which is relatively compact in size, efficient in operation, and substantially vibration free.

Yet another object resides in the provision of a cooling system of the above-described type which is lightweight and compact and thus suitable for use in remote locations, and which is substantially vibration free during operation so as to minimize interference with the electronic device with which it is associated.

A further object concerns the provision of a cooling system for industrial television cameras which incorporates for cooling purposes a vortex tube unit for converting compressed air at ambient temperatures into hot and cold air output streams, wherein both of such output streams may be used for cooling purposes. A related object resides in the provision of such a system wherein the hot output stream may be additionally used to purge contaminants from the camera lens.

These and other objects, features, and advantages of the present invention will become apparent from consideration of the following description, the appended claims and the accompanying drawings, in which:

FIGURE 1 is a vertical sectional view taken along the longitudinal center axis of one embodiment of a cooling system incorporating the principles of the present invention;

FIGURE 2 is a transverse sectional view taken along line 2—2 in FIGURE 1;

FIGURE 3 is a transverse sectional view taken along line 3—3 in FIGURE 1;

FIGURE 4 is a bottom plan view of that portion of the apparatus shown in FIGURE 3, positioned within its environmental housing which is also shown in section;

FIGURE 5 is a vertical sectional view taken along the longitudinal axis of a portion of a second embodiment of the present invention; and FIGURE 6 is a side elevational view partly in section illustrating a portion of a third embodiment of the present invention.

Generally speaking, applicant's invention comprises the combination of a compressed air operated vortex tube type cooling unit and means for supporting and shielding a television camera or the like, and a lens extension if one is used, and for facilitating the use of the cold air output of the cooling unit to cool the camera in an economical and efficient manner. In applications where a lens extension is used, additional means are provided for utilizing the warm air output of the cooling device to purge contaminants from the camera lens at the end of the extension and to provide cooling of the extension. For extremely high temperature applications where a lens extension is used means are provided for circulating a coolant, such as cold water, about the lens extension to provide additional cooling.

The vortex tube cooling unit utilized is constructed in accordance with the general principles discovered by Ranque and described in his United States Letters Patent No. 1,952,281. It was his discovery that when compressed air is permitted to enter through a tangential nozzle into a cylindrical container a turbulent flow of gas having a screw-like swirling motion, tending to escape through both ends of the container, is created. This rotating air stream produces a region of increased pressure near the wall of the cylinder and a region of decreased pressure near the axis, and he discovered that if the cylinder is substantially closed by an orifice immediately adjacent the inlet nozzle which permits the escape of air only from the central region, while the other end is throttled, the air escaping through the orifice will have a substantially reduced temperature while the air escaping through the throttled end will show a temperature increase. Thus, a cooling unit constructed in this manner and supplied solely with air under pressure at a given temperature will operate to transform this inlet air into two streams of outlet air at substantially different temperatures, one higher and the other lower than the initial temperature.

Referring to FIGURE 1, the cooling unit, indicated generally at 10, comprises an elongated tubular casing 12 having therein for most of its length a cylindrical block of thermal insulating material 14 having a longitudinally extending bore 16 therein which forms a hot air passageway through the unit. Compressed air from any suitable source is introduced into the unit by means of a conduit 18 which passes through the casing wall and a portion of insulating block 14. As can be seen in FIGURE 2, conduit 18 is offset transversely from the vertical center plane of the unit and the passageway therein communicates directly with a compressed air inlet passageway or nozzle 20 in block 14 which is substantially tangential to bore 16. Thus, when conduit 18 is placed in communication with a source of compressed air the latter will be introduced tangentially into bore 16 to form a swirling vortex of air therein. The block of insulating material does not extend all the way to the leftmost end of the casing so that there is defined a chamber 20 therein which receives the air from the adjacent end of bore 16. This air will be discharged from the unit through a passageway 24 in casing 14 and a hot air conduit 26 having a flow-restricting orifice 28 at the outer free end thereof. Since it is desirable that the hot air flow dissipate its swirling motion prior to escape through orifice 28, applicants have discovered that by providing bore 17 with fluid friction inducing surface irregularities or roughened areas, such as by providing grooves or ridges as indicated at 17, and by providing a chamber such as 28 having a substantially larger cross-sectional area than the corresponding area of bore 16, say at least four times greater, it is possible to substantially reduce the length of the hot air passageways below that which would otherwise be required.

Immediately adjacent compressed air inlet nozzle 20 on the opposite side thereof from bore 16 is a cold air orifice member 30 having a cold air orifice 32 in the surface 34 thereof most adjacent nozzle 20 and a diverging passageway 36 extending longitudinally therefrom toward the rightmost end of the casing. This member is preferably made of heat insulating material. Although surface 34, which is substantially flat, may be formed perpendicular to the axis of bore 16 it has been found that somewhat improved cooling efficiencies may be obtained if this surface is made oblique with respect to this axis, probably because it improves the necessary swirling action of the air. Although it is not critical, an angle of approximately 15° from a transverse plane has been found to be advantageous. As can be seen in FIGURE 1, it has been found beneficial if the point on this surface axially nearest nozzle 20 is positioned on the same side of bore 16 as the nozzle, and preferably slightly above the center of the bore. Substantially surrounding the discharge end of divergent passageway 36 is provided insulating material which may be formed of two separate pieces 38 and 40, as shown in FIGURE 1. Cold air is communicated from diverging passageway 36 through a passageway 42 in the insulating material, a passageway 44 in the casing and thence into a cold air discharge conduit 46.

The insulating material used at 38 and 40 may be of any suitable type, such as those previous types comprising fiberglass, capable of temperature insulating the various components of the unit, as well as of dampening audible and other vibrations which are normally caused by a flow of relatively high velocity air, the reduction of such vibrations being particularly important when the unit is used in connection with delicate electronic equipment and camera equipment which will not function properly if subject to too much vibration. The thermal insulating material of members 14 and 30 on the other hand must be sufficiently rigid to define their respective passageways. It has been found that polymethylmethacrylate or the like is a suitable substance to be used for this latter insulating material. In the event the hot air exhaust from orifice 28 is too noisy or causes excessive vibrations a suitable muffler may be connected thereto.

Although the theory of operation of the vortex cooling unit is not thoroughly understood, Ranque says in his patent that the operation "consists essentially in dividing the fluid under pressure, which is admitted tangentially into a vessel having the shape of a body of revolution, into two coaxial sheets of fluid moving with a gyratory motion and reacting upon each other so as to produce, under the action of centrifugal force, the compression of the outer sheet by the inner sheet which expands, this compression absorbing a certain amount of work, which is evidenced by a rise in the temperature of the compressed sheet at the expense of the other sheet, which is thus cooled." It has been reported that a vortex type cooling unit can deliver a blast of air twenty times colder than air which is chilled by permitting it simply to expand through a venturi tube from a high pressure source.

Apparently what happens is that the compressed air shoots around in a spiral at the intersection of nozzle 20 and bore 16 to form a high velocity vortex of air. Molecules of air at the outside of the vortex are slowed by friction with the wall of the bore, and because these slower moving molecules are subject to the rules of centrifugal force they tend to fall toward the center of the vortex. As this occurs, however, the fast moving molecules just inside outer layer of the vortex transfer some of their energy to this layer by bombarding some of its slow moving molecules and speeding them up. This is apparently viscous shear since the mass is tending toward constant angular velocity, and each layer in the vortex transmits some of its energy to the next outer layer by viscous interaction as the mass tends toward constant angular velocity. The overall end result of this process is the accumulation of relatively low energy, slow moving molecules in the center of the whirling vortex and of relatively fast moving, high energy molecules around the outside. This transfer of energy from the axis to the circumference apparently is what causes the vortex to consist of a core of cold air surrounded by a rim of hot air, or at least by a rim of high velocity air which becomes hotter as it loses its kinetic energy. Therefore, considering the unit shown in FIGURE 1, the outer rim of air is prevented from flowing into cold air orifice 32 by surface 34. On the other hand, the colder inner core of air, which is also above atmospheric pressure, flows through orifice 32 and becomes further cooled as it expands to atmospheric pressure through diverging passageway 36 and eventually to atmosphere. The outer rim of air flows along bore 16 and into chamber 22 and as it loses its kinetic energy it becomes warmer.

Still referring to FIGURE 1, cooling unit 10 is secured to a tubular cylindrical environment housing 48 by means of studs 50 and nuts 52. This particular design environmental housing is ideally suited for housing a television camera or the like for high temperature operations which are of moderate severity, such as for the rolling of ingots or the like in a steel mill. At the forward end of the housing is provided a vertical wall 54 having a centrally disposed opening 56 therein in front of which is secured a window 58 by means of a suitable retaining ring 60. If desired, the forward end of the housing may extend upwardly and outwardly from the front face of wall 54 in the manner shown to provide for protection of the window. At the rearward end of the housing is a vertical wall 62 to which is secured a camera-supporting bracket 64 having upwardly and rearwardly tapering sides 66. Rear wall 62 may be secured to the housing by means of conventional spring clips, such as shown at 68 and 70 in FIGURE 4, and an O-ring 72 may be provided between the housing and end wall to effect a seal. Supported upon bracket 64 is a television camera or the like 74 having a lens assembly 76 and secured about the outside thereof a manifold indicated generally at 78. The necessary external electrical connections to the camera may be made passing the necessary wires through a cable 80 passing through a grommet or the like 82 in rear wall 62.

Generally speaking, the camera is cooled by communicating the cold air from conduit 46, which extends into housing 48, through a fitting 84, and a piece of flexible tubing 86 to an inlet conduit 88 into the manifold. After this cold air supplied by cooling unit 10 has been circulated through the camera it flows out of the manifold and through the housing towards the front where it is vented through a vent opening 90 extending through front wall 54 and retaining ring 60. This vent is preferably positioned above window 58 so that it is protected from clogging and the like by the shielding effect of the forwardly extending upper edge of the housing. Also it should be sufficiently small to maintain a small positive pressure of swirl p.s.i. in the housing.

As can best be seen in FIGURES 3 and 4, the television camera is generally rectangular in elevation and substantially square in cross section, and since the details of construction thereof are not pertinent for the present purposes only the outside surface of the camera case is shown. Manifold 78 is generally box-like in configuration and surrounds camera 74 to define air passageways 92 and 94 along the respective opposite sides thereof, the latter being provided with suitable louvers 96 to facilitate the flow of air through the camera mechanism and circuitry. As best seen in FIGURE 4, cold air from the cooling unit enters the manifold through conduit 88, which extends into chamber 94, from which it passes through the louvers on that side of the camera, then across and through the camera mechanism to cool it, and then out through the louvers on the opposite side of the camera casing into chamber 92 which may be open at either end thereof, as indicated at 98. From there it circulates forwardly through the annular chamber between the manifold and housing 48 until it is discharged to atmosphere through vent 90. If desired, vent 90 may be alternatively located in rear wall 62, rather than in the front wall. Increased cooling efficiency may be obtained if the manifold is lined on the inside with a thin layer of insulating material, such as asbestos or the like. The same is true if the exterior of the environmental housing is polished, chrome plated or the like to reflect heat radiated ambient heat.

In order to remove any impurities, including entrained oil, from the cooling air which may adversely affect the camera mechanism there may be provided adjacent inlet conduit 88 a filter comprising a channel-shaped perforated retaining member 100 which retains a suitable filtering material 102, such a fiberglass or the like, in a position such that all cooling air entering through conduit 88 must pass through it. The filter also serves to muffle or damp pulsations in the air flow to prevent sound waves or other induced vibrations from interfering with optimum camera performance. Manifold 78 may be secured to camera 74 by means of longitudinally extending opposed flanges 104 and 106 secured to the bottom of the camera case by screws or the like 108.

As an example of the performance which may be expected from cooling units of the aforedescribed type, applicants have discovered that with a unit constructed substantially according to the proportions shown in FIGURE 1, wherein casing 12 is approximately 10½ inches long, an input of approximately 30–40 c.f.p.m. of 130° F. air at approximately 60 p.s.i. will result in a cold output flow through conduit 46 of air at approximately 30° F. and a hot output flow through conduit 26 of air at approximately 140 to 145° F. Thus, with a relatively small volume and pressure input a temperature differential of approximately 100° F. may be obtained, approximately 12% of the input flow being in the form of cold air output. Such a unit may be operated with compressed inlet air at pressures as low as 30 p.s.i., which has been found to give approximately 80° F. temperature differential. In this regard it has been noted that the provision of the roughed surface in bore 16 makes the pressure versus temperature relationship more linear.

For a given inlet pressure and cold air orifice size, the pressure differential obtainable, as well as the relative hot and cold flow rates, may be varied by varying the diameter of orifice 28. In other words, this orifice regulates the back pressure in the cooling unit and in its absence there would be little or no cold air exhaust. For most efficient operation it should be positioned sufficiently far from the inlet nozzle that the hot air stream has lost its swirling motion before passing through it, the roughened bore surface and chamber 22 in the present unit serving to substantially reduce this distance. On the other hand, cold air orifice 32 should be positioned as close as possible to the inlet nozzle for best performance. If greater amounts of cooling are required the entire unit may be increased in size, although input flow rates will also increase.

A more severe application of television cameras resides in their use for viewing the interior of boilers through one of the ports thereof. In applications such as these a lens extension is used which projects inside the port of the boiler and therefore in addition to camera cooling problems there is also a need for cooling the lens extension and for preventing dust, flyash, soot and so on from contacting the vulnerable lens at the forward end of the lens extension. In applications such as those in which the first embodiment may be used this is of course not a problem since there is no lens extension and the entire camera and lens assembly may be enclosed within the environmental housing. In FIGURE 5 there is illustrated an embodiment of the invention wherein means are provided for cooling both the television camera and a lens extension and for purging contaminants from the lens when such equipment is used in these more severe applications. In this figure the boiler is indicated generally at 110 and is shown as being provided with the usual aspirator port 112. These ports are usually of the general configuration illustrated and comprise a plurality of inwardly directed air nozzles 114 supplied by a manifold 116 which receives its air from a suitable source of air under pressure through a conduit 120. Usually when the door for the port (this door is not shown because in this figure it is fully open and the camera assembly is engaging the open port) is closed a small quantity of air passes through nozzles 114 to prevent leakage of hot air and combustion products through the port, however when the door is opened there is usually an arrangement whereby such opening trips a suitable valve to greatly increase the volume of air flowing through nozzles 114 so that the combustion products and so on inside the furnace cannot escape through the open port. These jets of air also serve to cool the port to some extent.

In this embodiment the cooling unit, camera, manifold and environmental housing are substantially identical to that disclosed in FIGURE 1 with the exception that the forward end of housing 48 is provided with a flat vertical wall 122 through which extends a lens extension 124, there being no window in the housing. This lens extension includes a lens tube 126 having a forward lens assembly 128 and surrounded by an outer sheath 130 which is spaced therefrom, as at 131, by means of spacing elements 132. Sheath 130 is provided at its forwardmost end by an opening 134 through which the interior of the boiler may be viewed. At its other end the lens extension is secured to the television camera in the usual manner in lieu of its normal lens, such as that shown in FIGURE 1, and is secured to wall 122 by means of a flange 136 and a screw or the like 138. Inside housing 48 and surrounding sheath 130 is a collar 140 which is secured to the lens extension by means of a screw 142 and is provided with a threaded opening 144 which communicates with the annular space 131 between the lens tube and sheath by means of an aligned hole in the latter. Threadably secured within opening 44 is a conduit 146 which extends through casing 48 and is connected to hot air discharge conduit 26 of cooling unit 10 by means of a suitable elbow fitting 148.

Thus, the hot air output of the cooling unit which would normally be wasted is in this embodiment utilized to cool the lens extension to some extent (although relatively hot it is substantially cooler than the interior temperature of the boiler to which the lens extension is exposed) and also to provide a purging blast of air outwardly through opening 134 in the sheath to prevent contaminants from contacting the forward lens assembly 128. The environmental housing may be properly positioned with respect to the boiler port by means of a cylindrical mounting member 152 having a first flange 154 secured to wall 122 of the housing, an axial bore 155 through which the lens extension loosely extends, and a second flange 156 adapted to engage and if desired be removably secured to the outside surface of the boiler. By spacing the housing from the boiler somewhat it is possible to greatly reduce the temperatures therein. Cooling of the lens extension is effected by the passage of air through annular passageway 131 and also by its passage through several vents 150 in the sheath which allow it to pass between the lens extension and bore 155.

An application of the present invention which is even more severe from the temperature standpoint than the one just considered is where it is desired to view the inside of a furnace, such as a glass melting furnace or the like, where there is unlikely to be an aspirator port or for that matter any port at all. In environments such as these the invention may be embodied in the form illustrated in FIGURE 6 wherein the furnace wall is indicated at 160. For such applications the environmental housing, cooling unit and "hot" air purged and cooled lens extension may be exactly the same as that shown in FIGURE 5, although the latter may be somewhat longer depending on the thickness of the wall of the furnace through which it must extend. Since in this embodiment there is no aspirating port to provide some cooling of the lens extension, there is provided a water cooling jacket 162 which is positioned within a suitable opening through the furnace wall and is provided at its outer end with a flange 164 adapted to be secured in any suitable manner to end wall 122 of environmental housing 48. Jacket 162 is provided with a longitudinally extending bore 166 through which loosely extends lens extension 124. On the portion of jacket 162 which extends outside the furnace wall 160 there is provided a cold water supply conduit 168 and a return conduit 170. Cooling water entering conduit 168 passes into the jacket into an elongated annular water passageway 172 through which it flows to the forwardmost end of the jacket where it then flows into a second annular water passageway 174 back the length of the jacket and into return conduit 170. Accordingly, cooling of the lens extension in this embodiment is accomplished by the flow of the "hot" air output of cooling unit 10 (which is relatively cool with respect to ambient temperatures) through sheath 130 and opening 134, which also serves to purge contaminants from the forward lens assembly 128, and through vents 150 along the outside surface of the lens extension, and by the flow of cold water through jacket 164 which surrounds the lens extension. As in all earlier embodiments the camera is cooled by the cold air output of cooling unit 10.

Thus, there are disclosed in the above description and in the drawings several exemplary embodiments of the invention which fully and effectively accomplish the objects thereof. However, it will be apparent that variations in the details of construction may be indulged in without departing from the sphere of the invention herein described, or the scope of the appended claims.

What is claimed is:

1. Apparatus for utilizing air under pressure for cooling a temperature sensitive device having ventilation openings in the casing thereof, comprising a substantially enclosed environmental housing, support means in said housing for supporting the device to be cooled, cooling means mounted on said housing including a bore, compressed air inlet means for introducing compressed air tangentially into said bore adjacent one end thereof, orifice means adjacent said compressed air inlet on the opposite side thereof from said bore, means for communicating air passing through said orifice into certain of the ventilation openings in the casing for the device, and vent means in said housing for venting to atmosphere the air issuing from the other ventilation openings.

2. Apparatus for utilizing air under pressure for cooling temperature sensitive devices, comprising a substantially enclosed environmental housing, support means in said housing for supporting the device to be cooled, manifold means disposed within and substantially spaced from the walls of said housing adapted to substantially enclose opposite sides of the device, cold air inlet means for communicating cold air into said manifold means on one side of said device, air outlet means for communicating air from the opposite side of the device out of said manifold means into said environmental housing, vent means in said housing for venting to atmosphere the air from said air outlet, and cooling means mounted on said housing including a bore, compressed air inlet means for introducing compressed air tangentially into said bore adjacent one end thereof, orifice means adjacent said compressed air inlet on the opposite side thereof from said bore, and means for communicating air passing through said orifice to said cold air inlet means for said manifold means.

3. Apparatus for utilizing air under pressure for cooling temperature sensitive devices, comprising a substantially enclosed environmental housing having a detachable wall portion at one end thereof, support means mounted on said detachable wall portion for supporting the device to be cooled in said housing, manifold means disposed within and substantially spaced from the walls of said housing adapted to substantially enclose opposite sides of the device, cold air inlet means for communicating cold air into said manifold means on one side of said device, air outlet means for communicating air from the opposite side of the device out of said manifold means into said environmental housing, vent means in said housing for venting to atmosphere the air from said air outlet, and cooling means mounted on said housing including a bore, compressed air inlet means for introducing compressed air tangentially into said bore adjacent one end thereof, orifice means adjacent said compressed air inlet on the opposite side thereof from said bore, and means for communicating air passing through said orifice to said cold air inlet means for said manifold means.

4. Apparatus for utilizing air under pressure for cooling an industrial television camera having ventilation openings in the sides thereof, comprising a substantially enclosed environmental housing having a detachable wall portion at one end thereof and a window at the opposite end thereof, support means mounted on said detachable wall portion for supporting the camera in said housing, manifold means disposed within and substantially spaced from the walls of said housing adapted to substantially enclose opposite sides of the camera, cold air inlet means for communicating cold air into said manifold means on one side of the camera, air outlet means for communicating air from the opposite side of the camera out of said manifold means into said environmental housing, vent means in said housing for venting to atmosphere the air from said air outlet, and cooling means mounted on said housing including a bore, compressed air inlet means for introducing compressed air tangentially into said bore adjacent one end thereof, orifice means adjacent said compressed air inlet on the opposite side thereof from said bore, and means for communicating air passing through said orifice to said cold air inlet means for said manifold means.

5. Apparatus as claimed in claim 4, wherein said housing has a heat reflecting exterior surface.

6. Apparatus for utilizing air under pressure for cooling temperature sensitive devices, comprising a substantially enclosed environmental housing, support means in said housing for supporting the device to be cooled, manifold means disposed within and substantially spaced from the walls of said housing adapted to substantially enclose opposite sides of the device, cold air inlet means for communicating cold air into said manifold means on one side of said device, means for filtering and sound muffling air flowing into said manifold through said cold air inlet means, air outlet means for communicating air from the opposite side of the device out of said manifold means into said environmental housing, vent means in said housing for venting to atmosphere the air from said air outlet, and cooling means mounted on said housing including a bore, compressed air inlet means for introducing compressed air tangentially into said bore adjacent one end thereof, orifice means adjacent said compressed air inlet on the opposite side thereof from said bore, and means for communicating air passing through said orifice to said cold air inlet means for said manifold means.

7. Apparatus for utilizing air under pressure for cooling an industrial television camera having ventilation openings in the sides thereof, comprising a substantially enclosed environmental housing having a detachable wall portion at one end thereof and a window at the opposite end thereof, support means mounted on said detachable wall portion for supporting the camera in said housing, manifold means disposed within and substantially spaced from the walls of said housing adapted to substantially enclose opposite sides of the camera, cold air inlet means for communicating cold air into said manifold means on one side of the camera, means for filtering and sound muffling air flowing into said manifold through said cold air inlet means, air outlet means for communicating air from the opposite side of the camera out of said manifold means into said environmental housing, vent means in said housing for venting to atmosphere the air from said air outlet, and cooling means mounted on said housing including a bore, compressed air inlet means for introducing compressed air tangentially into said bore adjacent one end thereof, orifice means adjacent said compressed air inlet on the opposite side thereof from said bore, and means for communicating air passing through said orifice to said cold air inlet means for said manifold means.

8. Apparatus for utilizing air under pressure for cooling a temperature sensitive device having ventilation openings in the casing thereof, comprising: a substantially enclosed environmental housing; support means in said housing for supporting the device to be cooled; cooling means mounted on said housing including an elongated block of insulating material having a longitudinal axially extending bore therethrough, compressed air inlet nozzle means for introducing compressed inlet air tangentially into said bore, means defining a roughened surface in said bore between one end thereof and said inlet nozzle means, means defining a chamber in communication with said one end of said bore, a hot air outlet passageway in communication with said chamber and having a flow-restricting orifice therein, means defining an orifice in said bore adjacent said inlet nozzle means on the opposite side thereof from said roughened surface, the diameter of said orifice being less than that of said bore and the surface of said orifice-defining means adjacent said inlet nozzle means lying in an oblique plane with respect to the axis of said bore, the portion of said oblique surface axially nearest said inlet nozzle means being positioned on the same side of said bore as said inlet nozzle means, means defining a diverging cold air passageway extending axially from said orifice away from said inlet nozzle means, insulating material substantially surrounding the diverging end of said cold air passageway, and means defining a cold air outlet passageway from the diverging end of said cold air passageway through said last-mentioned insulating material; means for communicating air from said cold air outlet passageway into certain of the ventilation openings in the casing for the device; and vent means in said housing for venting to atmosphere the air issuing from the other ventilation openings.

9. Apparatus for utilizing air under pressure for cooling temperature sensitive devices, comprising: a substantially enclosed environmental housing; support means in said housing for supporting the device to be cooled; manifold means disposed within and spaced from the walls of said housing adapted to substantially enclose opposite sides of the device; cold air inlet means for communicating cold air into said manifold means on one side of said device; air outlet means for communicating air from the opposite side of the device out of said manifold means into said environmental housing; vent means in said housing for venting to atmosphere the air from said air outlet; cooling means mounted on said housing including an elongated block of insulating material having a longitudinal axially extending bore therethrough, compressed air inlet nozzle means for introducing compressed inlet air tangentially into said bore, means defining a roughened surface in said bore between one end thereof and said inlet nozzle means, means defining a chamber in communication with said one end of said bore, a hot air outlet passageway in communication with said chamber and having a flow-restricting orifice therein, means defining an orifice in said bore adjacent said inlet nozzle means on the opposite side thereof from said roughened surface, the diameter of said orifice being less than that of said bore and the surface of said orifice-defining means adjacent said inlet nozzle means lying in an oblique plane with respect to the axis of said bore, the portion of said oblique surface axially nearest said inlet nozzle means being positioned on the same side of said bore as said inlet nozzle means, means defining a diverging cold air passageway extending axially from said orifice away from said inlet nozzle means, insulating material substantially surrounding the diverging end of said cold air passageway, and means defining a cold air outlet passageway from the diverging end of said cold air passageway through said last-mentioned insulating material; and means for communicating air from said cold air outlet passageway to said cold air inlet means for said manifold means.

10. Apparatus for utilizing air under pressure for cooling an industrial television camera having ventilation openings in the sides thereof, comprising: a substantially enclosed environmental housing having a window at one end thereof, support means for supporting the camera in said housing; manifold means disposed within and spaced from the walls of said housing adapted to substantially enclose opposite sides of the camera; cold air inlet means for communicating cold air into said manifold means on one side of the camera; air outlet means for communicating air from the opposite side of the camera out of said manifold means into said environmental housing; vent means in said housing for venting to atmosphere the air from said air outlet; cooling means mounted on said housing including an elongated block of insulating material having a longitudinal axially extending bore therethrough, compressed air inlet nozzle means for introducing compressed inlet air tangentially into said bore, means defining a roughened surface in said bore between one end thereof and said inlet nozzle means, means defining a chamber in communication with said one end of said bore, a hot air outlet passageway in communication with said chamber and having a flow-restricting orifice therein, means defining an orifice in said bore adjacent said inlet nozzle means on the opposite side thereof from said roughened surface, the diameter of said orifice being less than that of said bore and the surface of said orifice-defining means adjacent said inlet nozzle means lying in an oblique plane with respect to the axis of said bore, the portion of said oblique surface axially nearest said inlet nozzle means being positioned on the same side of said bore as said inlet nozzle means, means defining a diverging cold air passageway extending axially from said orifice away from said inlet nozzle means, insulating material substantially surrounding the diverging end of said cold air passageway, and means defining a cold air outlet passageway from the diverging end of said cold air passageway through said last-mentioned insulating material; and means for communicating air from said cold air outlet passageway to said cold air inlet means for said manifold means.

11. Apparatus for utilizing air under pressure for cooling temperature sensitive devices, comprising: a substantially enclosed environmental housing; support means in said housing for supporting the device to be cooled; manifold means disposed within and spaced from the walls of said housing adapted to substantially enclose opposite sides of the device; cold air inlet means for communicating cold air into said manifold means on one side of said device; means for filtering and sound muffling air flowing into said manifold through said cold air inlet means; air outlet means for communicating air from the opposite side of the device out of said manifold means into said environmental housing; vent means in said housing for venting to atmosphere the air from said air outlet; cooling means mounted on said housing including an elongated block of insulating material having a longitudinal axially extending bore therethrough, compressed air inlet nozzle means for introducing compressed inlet air tangentially into said bore, means defining a roughened surface in said bore between one end thereof and said inlet nozzle means, means defining a chamber in communication with said one end of said bore, a hot air outlet passageway in communication with said chamber and having a flow-restricting orifice therein, means defining an orifice in said bore adjacent said inlet nozzle means on the opposite side thereof from said roughened surface, the diameter of said orifice being less than that of said bore and the surface of said orifice-defining means adjacent said inlet nozzle means lying in an oblique plane with respect to the axis of said bore, the portion of said oblique surface axially nearest said inlet nozzle means being positioned on the same side of said bore as said inlet nozzle means, means defining a diverging cold air passageway extending axially from said orifice away from said inlet nozzle means, insulating material substantially surrounding the diverging end of said cold air passageway, and means defining a cold air outlet passageway from the diverging end of said cold air passageway through said last-mentioned insulating material; and means for communicating air from said cold air outlet passageway to said cold air inlet means for said manifold means.

12. Apparatus for utilizing air under pressure for cooling temperature sensitive devices, comprising: a substantially enclosed environmental housing; support means for supporting the device to be cooled in said housing; manifold means disposed within and spaced from the walls of said housing adapted to substantially enclose opposite sides of the device; cold air inlet means for communicating cold air into said manifold means on one side of said device; air outlet means for communicating air from the opposite side of the device out of said manifold means into said environmental housing; vent means in said housing for venting to atmosphere the air from said air outlet; cooling means mounted on said housing including means defining a longitudinal and axially extending bore, compressed air inlet nozzle means for introducing compressed inlet air tangentially into said bore adjacent one end thereof, means defining a roughened surface in said bore between the opposite end thereof and said inlet nozzle means, a hot air outlet passageway in communication with said opposite end of said bore and having flow restricting means therein, and means defining an orifice adjacent said inlet nozzle means on the opposite side thereof from said bore and coaxial with the latter, the diameter of said orifice being less than that of said bore and the surface of said orifice-defining means adjacent said inlet nozzle means being substantially flat and lying in an oblique plane with respect to the axis of said bore; and means for communicating air from said orifice to said cold air inlet means for said manifold means.

13. Apparatus for utilizing air under pressure for cooling an industrial television camera having ventilation openings in the sides thereof, comprising: a substantially enclosed environmental housing having a window at one end thereof; support means for supporting the camera in said housing; manifold means disposed within and spaced from the walls of said housing adapted to substantially enclose opposite sides of the camera; cold air inlet means for communicating cold air into said manifold means on one side of the camera; air outlet means for communicating air from the opposite side of the camera out of said manifold means into said environmental housing; vent means in said housing for venting to atmosphere the air from said air outlet; cooling means mounted on said housing including means defining a longitudinal and axially extending bore, compressed air inlet nozzle means for introducing compressed inlet air tangentially into said bore adjacent one end thereof, means defining a roughened surface in said bore between the opposite end thereof and said inlet nozzle means, a hot air outlet passageway in communication with said opposite end of said bore and having flow restricting means therein, and means defining an orifice adjacent said inlet nozzle means on the opposite side thereof from said bore and coaxial with the latter, the diameter of said orifice being less than that of said bore and the surface of said orifice-defining means adjacent said inlet nozzle means being substantially flat and lying in an oblique plane with respect to the axis of said bore; and means for communicating air from said orifice to said cold air inlet means for said manifold means.

14. Apparatus for utilizing air under pressure for cooling temperature sensitive devices, comprising: a substantially enclosed environmental housing; support means in said housing for supporting the device to be cooled; manifold means disposed within and spaced from the walls of said housing adapted to substantially enclose opposite sides of the device; cold air inlet means for communicating cold air into said manifold means on one side of said device; means for filtering and sound muffling air flowing into said manifold through said cold air inlet means; air outlet means for communicating air from the opposite side of the device out of said manifold means into said environmental housing; vent means in said housing for venting to atmosphere the air from said air outlet; cooling means mounted on said housing including means defining a longitudinal and axially extending bore, compressed air inlet nozzle means for introducing compressed inlet air tangentially into said bore adjacent one end thereof, means defining a roughened surface in said bore between the opposite end thereof and said inlet nozzle means, a hot air outlet passageway in communication with said opposite end of said bore and having flow restricting means therein, and means defining an orifice adjacent said inlet nozzle means on the opposite side thereof from said bore and coaxial with the latter, the diameter of said orifice being less than that of said bore and the surface of said orifice-defining means adjacent said inlet nozzle means being substantially flat and lying in an oblique plane with respect to the axis of said bore; and means for communicating air from said orifice to said cold air inlet means for said manifold means.

15. Apparatus for utilizing air under pressure for cooling a temperature sensitive device having ventilation openings in the casing thereof, comprising: a substantially enclosed environmental housing; support means in said housing for supporting the device to be cooled; cooling means mounted on said housing including means defining a longitudinal and axially extending bore, compressed air inlet nozzle means for introducing compressed inlet air tangentially into said bore adjacent one end thereof, means defining a roughened surface in said bore between the opposite end thereof and said inlet nozzle means, a hot air outlet passageway in communication with said opposite end of said bore and having flow restricting means therein, and means defining an orifice adjacent said inlet nozzle means on the opposite side thereof from said bore and coaxial with the latter, the diameter of said orifice being less than that of said bore and the surface of said orifice-defining means adjacent said inlet nozzle means being substantially flat and lying in an oblique plane with respect to the axis of said bore; means for communicating air from said orifice into certain of the ventilation openings in the casing for the device; and vent means in said housing for venting to atmosphere the air issuing from the other ventilation openings.

16. Apparatus for viewing the interiors of boilers, furnaces and the like, comprising: a substantially enclosed environmental housing; a television camera positioned within said housing; a lens extension on said television camera extending through one end of said housing to a point substantially therefrom and having a lens assembly at the free end thereof; support means for supporting said camera to opposite sides of said camera having ventilation openings therein; cold air inlet means for communicating cold air into said ventilation openings on one side of said camera; vent means in said housing for venting to atmosphere air issuing from said ventilation openings on the opposite side of said camera; vortex tube type cooling means mounted on said housing and having inlet means for receiving air under pressure, cold air outlet means and warm air outlet means; means for communicating cold air from said cold air outlet means to said cold air inlet means; a sheath surrounding said lens extension and defining an annular space therebetween, said sheath having a viewing aperture therethrough at the free end thereof; and means for communicating warm air from said warm air outlet means of said cooling means to said annular passageway.

17. Apparatus for viewing the interiors of boilers, furnaces and the like, comprising: a substantially enclosed environmental housing; a television camera positioned within said housing; a lens extension on said television camera extending through one end of said housing to a point substantially spaced therefrom and having a lens assembly at the free end thereof; support means for supporting said camera; manifold means disposed within and spaced from the walls of said housing adapted to substantially enclose opposite sides of said camera, said opposite sides having ventilation openings therein; cold air inlet means for communicating cold air into said manifold means on one side of said camera; air outlet means for communicating air from the opposite sides of said camera out of said manifold means into said environmental housing; vent means in said housing for venting to atmosphere air from said air outlet means; vortex tube type cooling means mounted on said housing and having inlet means for receiving air under pressure, cold air outlet means and warm air outlet means; means for communicating cold air from said cold air outlet means to said cold air inlet means for said manifold means; a sheath surrounding said lens extension and defining an annular space therebetween, said sheath having a viewing aperture therethrough at the free end thereof; and means for communicating warm air from said warm air outlet means of said cooling means to said annular passageway.

18. Apparatus for viewing the interiors of boilers, furnaces and the like, comprising: a substantially enclosed environmental housing; a television camera positioned within said housing; a lens extension on said television camera extending through one end of said housing to a point substantially spaced therefrom and having a lens assembly at the free end thereof, support means for supporting said camera; manifold means disposed within and spaced from the walls of said housing adapted to substantially enclose opposite sides of said camera, said opposite sides having ventilation openings therein; cold air inlet means for communicating cold air into said manifold means on one side of said camera; means for filtering and sound muffling air flowing into said manifold through said cold inlet air means; air outlet means for communicating air from the opposite sides of said camera out of said manifold means into said environmental housing; vent means in said housing for venting to atmosphere air from said air outlet means; a vortex tube type cooling means mounted on said housing and having inlet means for receiving air under pressure, cold air outlet means and warm air outlet means; means for communicating cold air from said cold air outlet means to said cold air inlet means for said manifold means; a sheath surrounding said lens extension and defining an annular space therebetween, said sheath having a viewing aperture therethrough at the free end thereof; and means for communicating warm air from said warm air outlet means of said cooling means to said annular passageway.

19. Apparatus for viewing the interiors of boilers, furnaces and the like, comprising: a substantially enclosed environmental housing; a television camera positioned within said housing; a lens extension on said television camera extending through one end of said housing to a point substantially spaced therefrom and having a lens assembly at the free end thereof; support means for supporting said camera to opposite sides of said camera having ventilation openings therein; cold air inlet means for communicating cold air into said ventilation openings on one side of said camera; vent means in said housing for venting to atmosphere air issuing from said ventilation openings on the opposite side of said camera; vortex tube type cooling means mounted on said housing and having inlet means for receiving air under pressure, cold air outlet means and warm air outlet means; means for communicating cold air from said cold air outlet means to said cold air inlet means; a sheath surrounding said lens extension and defining an annular space therebetween, said sheath having an air vent therein adjacent the outside face of said opposite end of said housing and a viewing aperture therethrough at the free end thereof; means for communicating warm air from said warm air outlet means of said cooling means to said annular passageway; and mounting means adapted to be positioned between said housing and the boiler, furnace or the like in which viewing is desired, said mounting means having a bore therethrough slightly larger than and adapted to receive said sheath to define an annular passageway therebetween through which warm air from said vent may flow.

20. Apparatus for viewing the interiors of boilers, furnaces and the like, comprising: a substantially enclosed environmental housing; a television camera positioned within said housing; a lens extension on said television camera extending through one end of said housing to a point substantially spaced therefrom and having a lens assembly at the free end thereof; support means for supporting said camera to opposite sides of said camera having ventilation openings therein; cold air inlet means for communicating cold air into said ventilation openings on one side of said camera; vent means in said housing for venting to atmosphere air issuing from said ventilation openings on the opposite side of said camera; vortex tube type cooling means mounted on said housing and having inlet means for receiving air under pressure, cold air outlet means and warm air outlet means; means for communicating cold air from said cold air outlet means to said cold air inlet means; a sheath surrounding said lens extension and defining an annular space therebetween, said sheath having a viewing aperture therethrough at the free end thereof; means for communicating warm air from said warm air outlet means of said cooling means to said annular passageway; and a water jacket surrounding said sheath for assisting in the cooling of the latter.

21. Apparatus for viewing the interiors of boilers, furnaces and the like, comprising: a substantially inclosed environmental housing; a television camera positioned within said housing; a lens extension on said television camera extending through one end of said housing to a point substantially spaced therefrom and having a lens assembly at the free end thereof; support means for supporting said camera to opposite sides of said camera having ventilation openings therein; cold air inlet means for communicating cold air into said ventilation openings on one side of said camera; vent means in said housing for venting to atmosphere air issuing from said ventilation openings on the opposite side of said camera; vortex tube type cooling means mounted on said housing and having inlet means for receiving air under pressure, cold air outlet means and warm air outlet means; means for communicating cold air from said cold air outlet means to said cold air inlet means; a sheath surrounding said lens extension and defining an annular space therebetween, said sheath having an air vent therein adjacent the outside face of said opposite end of said housing and a viewing aperture therethrough at the free end thereof; means for communicating warm air from said warm air outlet means of said cooling means to said annular passageway; and mounting means adapted to be positioned between said housing and the boiler, furnace or the like in which viewing is desired, said mounting means having a bore therethrough slightly larger than and adapted to receive said sheath to define an annular passageway therebetween through which warm air from said vent may flow, said mounting means including means defining water passageways for providing additional cooling of said sheath.

22. Apparatus for viewing the interiors of boilers, furnaces and the like, comprising: a substantially enclosed environmental housing; a television camera positioned within said housing; a lens extension on said television camera extending through one end of said housing to a point substantially spaced therefrom and having a lens assembly at the free end thereof; support means for supporting said camera to opposite sides of said camera having ventilation openings therein; cold air inlet means for communicating cold air into said ventilation openings on one side of said camera; vent means in said housing for venting to atmosphere air issuing from said ventilation openings on the opposite side of said camera; vortex tube type cooling means mounted on said housing and including means defining a longitudinal and axially extending bore, compressed air inlet nozzle means for introducing compressed inlet air tangentially into said bore adjacent one end thereof, means defining a roughened surface in said bore between the opposite end thereof and said inlet nozzle means, a warm air outlet passageway in communication with said opposite end of said bore and having flow restricting means therein, and means defining an orifice adjacent said inlet nozzle means on the opposite side thereof from said bore and coaxial with the latter, the diameter of said orifice being less than that of said bore and the surface of said orifice-defining means adjacent said inlet nozzle means being substantially flat and lying in an oblique plane with respect to the axis of said bore; means for communicating cold air from said orifice to said cold air inlet means; a sheath surrounding said lens extension and defining an annular space therebetween, said sheath having a viewing aperture therethrough at the free end thereof; and means for communicating warm air from said warm air outlet passageway to said annular passageway.

23. Apparatus for viewing the interiors of boilers, furnaces and the like, comprising: a substantially enclosed environmental housing; a television camera positioned within said housing; a lens extension on said television camera extending through one end of said housing to a point substantially spaced therefrom and having a lens assembly at the free end thereof; support means for supporting said camera to opposite sides of said camera having ventilation openings therein; cold air inlet means for communicating cold air into said ventilation openings on one side of said camera; vent means in said housing for venting to atmosphere air issuing from said ventilation openings on the opposite side of said camera; vortex tube type cooling means mounted on said housing and including means defining a longitudinal and axially extending bore, compressed air inlet nozzle means for introducing compressed inlet air tangentially into said bore adjacent one end thereof, means defining a roughened surface in said bore between the opposite end thereof and said inlet nozzle means, a warm air outlet passageway in communication with said opposite end of said bore and having flow restricting means therein, and means defining an orifice adjacent said inlet nozzle means on the opposite side thereof from said bore and coaxial with the latter, the diameter of said orifice being less than that of said bore and the surface of said orifice-defining means adjacent said inlet nozzle means being substantially flat and lying in an oblique plane with respect to the axis of said bore; means for communicating cold air from said orifice to said cold air inlet means; a sheath surrounding said lens extension and defining an annular space therebetween, said sheath having an air vent therein adjacent the outside face of said opposite end of said housing and a viewing aperture therethrough at the free end thereof; means for communicating warm air from said warm air outlet passageway to said annular passageway; and mounting means adapted to be positioned between said housing and the boiler, furnace or the like in which viewing is desired, said mounting means having a bore therethrough slightly larger than and adapted to receive said sheath to define an annular passageway therebetween through which warm air from said vent may flow.

24. Apparatus for viewing the interiors of boilers, furnaces and the like, comprising: a substantially enclosed environmental housing; a television camera positioned within said housing; a lens extension on said television camera extending through one end of said housing to a point substantially spaced therefrom and having a lens assembly at the free end thereof; support means for supporting said camera to opposite sides of said camera having ventilation openings therein; cold air inlet means for communicating cold air into said ventilation openings on one side of said camera; vent means in said housing for venting to atmosphere air issuing from said ventilation openings on the opposite side of said camera; vortex tube type cooling means mounted on said housing and including means defining a longitudinal and axially extending bore, compressed air inlet nozzle means for introducing compressed inlet air tangentially into said bore adjacent one end thereof, means defining a roughened surface in said bore between the opposite end thereof and said inlet nozzle means, a warm air outlet passageway in communication with said opposite end of said bore and having flow restricting means therein, and means defining an orifice adjacent said inlet nozzle means on the opposite side thereof from said bore and coaxial with the latter, the diameter of said orifice being less than that of said bore and the surface of said orifice-defining means adjacent said inlet nozzle means being substantially flat and lying in an oblique plane with respect to the axis of said bore; means for communicating cold air from said orifice to said cold air inlet means; a sheath surrounding said lens extension and defining an annular space therebetween, said sheath having an air vent therein adjacent the outside face of said opposite end of said housing and a viewing aperture therethrough at the free end thereof; means for communicating warm air from said warm air outlet passageway to said annular passageway; and mounting means adapted to be positioned between said housing and the boiler, furnace or the like in which viewing is desired, said mounting means having a bore therethrough slightly larger than and adapted to receive said sheath to define an annular passageway therebetween through which warm air from said vent may flow, said mounting means including means defining water passageways for providing additional cooling of said sheath.

References Cited by the Examiner

UNITED STATES PATENTS

| | | | |
|---|---|---|---|
| 1,952,281 | 3/1934 | Ranque | 62—5 |
| 3,075,113 | 1/1963 | Soar | 313—17 |
| 3,141,987 | 7/1964 | Altman | 313—17 |
| 3,208,229 | 9/1965 | Fulton | 62—5 |

DAVID G. REDINBAUGH, *Primary Examiner.*

R. L. RICHARDSON, *Assistant Examiner.*

UNITED STATES PATENT OFFICE
CERTIFICATE OF CORRECTION

Patent No. 3,277,238　　　　　　　　　　　　　　　October 4, 1966

Paul E. Sharp et al.

It is hereby certified that error appears in the above numbered patent requiring correction and that the said Letters Patent should read as corrected below.

Column 4, line 56, for "environment" read -- environmental --; column 13, line 32, after "substantially" insert -- spaced --.

Signed and sealed this 22nd day of August 1967.

(SEAL)
Attest:

ERNEST W. SWIDER　　　　　　　　　　　　　　　EDWARD J. BRENNER
Attesting Officer　　　　　　　　　　　　　　　　Commissioner of Patents